United States Patent
Warwick et al.

(10) Patent No.: US 12,330,788 B2
(45) Date of Patent: Jun. 17, 2025

(54) CARRIAGE ASSEMBLY WITH OVERLOAD PROTECTION

(71) Applicant: B/E Aerospace, Inc., Winston-Salem, NC (US)

(72) Inventors: Michael R.G. Warwick, Pleasant Garden, NC (US); Lyle T. Davis, Pfafftown, NC (US); Twinkle V. Jacob, Winston-Salem, NC (US); Bradley Steele, South Lyon, MI (US)

(73) Assignee: B/E Aerospace, Inc., Winston-Salem, NC (US)

( * ) Notice: Subject to any disclaimer, the term of this patent is extended or adjusted under 35 U.S.C. 154(b) by 431 days.

(21) Appl. No.: 17/353,207

(22) Filed: Jun. 21, 2021

(65) Prior Publication Data
US 2022/0402609 A1    Dec. 22, 2022

(51) Int. Cl.
  *B64D 11/00*    (2006.01)
  *B64D 11/06*    (2006.01)
  *E05D 15/06*    (2006.01)

(52) U.S. Cl.
  CPC ...... *B64D 11/0023* (2013.01); *B64D 11/0606* (2014.12); *E05D 15/0647* (2013.01); *E05D 15/0682* (2013.01)

(58) Field of Classification Search
  CPC . E05D 15/06; E05D 15/0621; E05D 15/0647; E05D 15/0652; E05D 15/0682;
  (Continued)

(56) References Cited

U.S. PATENT DOCUMENTS

| | | | | |
|---|---|---|---|---|
| 370,289 A | * | 9/1887 | Strobel | A47H 1/04 |
| | | | | 428/397 |
| 1,722,828 A | * | 7/1929 | Shonnard | E05D 15/0656 |
| | | | | 16/93 R |

(Continued)

FOREIGN PATENT DOCUMENTS

| CN | 108895084 A | 11/2018 |
|---|---|---|
| DE | 102009011859 A1 | 11/2009 |

(Continued)

OTHER PUBLICATIONS

Extended European Search Report in European Application No. 22179725.1 dated Nov. 17, 2022, 10 pages.

(Continued)

*Primary Examiner* — Emily M Morgan
(74) *Attorney, Agent, or Firm* — Suiter Swantz IP

(57) ABSTRACT

A carriage slider and rail assembly is disclosed. The assembly may include a linear rail including one or more surfaces that define a channel. The assembly may include a carriage slider sub-assembly. The sub-assembly may include a slider configured to be axially displaceable within the channel of the linear rail. The sub-assembly may include one or more overload protection lobes including a first overload protection lobe positioned adjacent to a first end of the slider and a second overload protection lobe positioned adjacent to a second end of the slider. The sub-assembly may include one or more friction reducing portions. The overload protection lobes may make contact with the channel of the linear rail when an abuse load is applied to provide overload protection. The overload protection lobes may be configured to not make contact with the channel of the linear rail when an abuse load is not applied.

13 Claims, 11 Drawing Sheets

(58) Field of Classification Search
CPC ... A47H 1/04; A47H 1/06; A47H 1/13; A47H 15/02; A47H 15/04; A47H 1/05; B64C 1/1438; B64D 11/0602
USPC ....... 16/93 R, 95 R, 96 R, 87.8, 87.6 R, 193, 16/362
See application file for complete search history.

(56) References Cited

U.S. PATENT DOCUMENTS

| | | | | |
|---|---|---|---|---|
| 3,248,749 | A * | 5/1966 | Ivor | A47H 15/04 16/95 D |
| 3,374,823 | A * | 3/1968 | Ford | H02G 5/04 160/331 |
| 3,430,678 | A * | 3/1969 | Barnes | A47H 5/032 16/93 R |
| 3,579,710 | A * | 5/1971 | Gartzke | A47H 15/04 16/93 R |
| 4,546,809 | A * | 10/1985 | Hadfield | A47H 15/04 160/126 |
| 4,943,110 | A * | 7/1990 | Pastva | B60J 5/065 49/411 |
| 4,948,208 | A | 8/1990 | Schubert | |
| 5,111,867 | A * | 5/1992 | Horton | B60J 5/065 16/87.6 R |
| 5,579,608 | A * | 12/1996 | Dunn | E06B 11/045 49/404 |
| 9,920,559 | B2 * | 3/2018 | Druckman | E06B 3/4636 |
| 10,717,513 | B2 | 7/2020 | Vayssiere et al. | |
| 10,806,288 | B2 * | 10/2020 | Schöpfer | A47H 15/02 |
| 11,708,162 | B2 | 7/2023 | Ivanov et al. | |
| 2001/0003854 | A1 * | 6/2001 | Lee | F16C 29/0602 16/94 R |
| 2006/0023979 | A1 | 2/2006 | Liedmann et al. | |
| 2011/0169288 | A1 | 7/2011 | Schreurs et al. | |
| 2015/0074961 | A1 * | 3/2015 | Glaze | A47H 15/04 24/716 |
| 2017/0106980 | A1 * | 4/2017 | Kuyper | B64D 11/0604 |
| 2017/0231413 | A1 * | 8/2017 | Schöpfer | A47H 15/00 160/330 |
| 2018/0066706 | A1 | 3/2018 | Yen et al. | |
| 2021/0179254 | A1 | 6/2021 | Scotford et al. | |
| 2023/0012146 | A1 * | 1/2023 | Sprague | E05D 15/0647 |

FOREIGN PATENT DOCUMENTS

| | | | |
|---|---|---|---|
| DE | 102020104480 A1 * | 4/2021 | ......... B64D 11/0602 |
| GB | 2208085 A | 2/1989 | |
| NZ | 583042 A | 3/2013 | |
| RU | 2019128024 A3 | 3/2021 | |
| WO | 2017066559 A1 | 4/2017 | |
| WO | 2018093825 A1 | 5/2018 | |
| WO | 2019216927 A1 | 11/2019 | |
| WO | 2021069886 A1 | 4/2021 | |

OTHER PUBLICATIONS

European Office Action dated Apr. 16, 2024; European Application No. 22180124.4.
U.S. Appl. No. 17/353,474, filed Jun. 21, 2021, Lyle T. Davis
Extended Search Report in European Application No. 22180124.4 dated Oct. 19, 2022, 11 pages.

* cited by examiner

CARRIAGE ASSEMBLY WITH OVERLOAD PROTECTION

BACKGROUND

Carriage assemblies are often used to provide slideable translation of one object relative to another. Current carriage assemblies have low static load limits, which makes them inadequate for many aircraft cabin applications.

SUMMARY

A carriage slider and rail assembly is disclosed, in accordance with one or more embodiments of the disclosure. In one embodiment, the assembly includes a linear rail including one or more surfaces that define a channel. In another embodiment, the assembly includes a carriage slider sub-assembly. In another embodiment, the carriage slider sub-assembly comprises a slider configured to be axially displaceable within the channel of the linear rail. In another embodiment, the carriage slider sub-assembly comprises one or more overload protection lobes including a first overload protection lobe positioned adjacent to a first end of the slider and a second overload protection lobe positioned adjacent to a second end of the slider. In another embodiment, the carriage slider sub-assembly comprises one or more friction reducing portions formed of a friction reducing material. In another embodiment, the one or more overload protection lobes are configured to make contact with a portion of the channel of the linear rail when an abuse load is applied to the assembly to provide overload protection. In another embodiment, the one or more overload protection lobes are configured to not make contact with a portion of the channel of the linear rail when an abuse load is not applied to the assembly.

In some embodiments, the one or more friction reducing portions may be integrated within a portion of the slider.

In some embodiments, the one or more friction reducing portions may be over molded to the portion of the slider.

In some embodiments, the one or more friction reducing portions may include a friction reducing casing configured to couple to a portion of the slider.

In some embodiments, the friction reducing casing may be configured to couple to the portion of the slider via interference fitting.

In some embodiments, the one or more friction reducing portions may include a first friction reducing portion coupled to a first portion of the channel and a second friction reducing portion coupled to a second portion of the channel, the first friction reducing portion configured to engage with a first portion of the slider when the slider is axially displaced within the channel of the linear rail, the second friction reducing portion configured to engage with a second portion of the slider when the slider is axially displaced within the channel of the linear rail.

In some embodiments, the one or more overload protection lobes may be formed of a metal.

In some embodiments, the one or more friction reducing portions may be formed of a plastic.

An actuatable door for an aircraft passenger suite installed within an aircraft cabin is disclosed, in accordance with one or more embodiments of the disclosure. In one embodiment, the actuatable door includes one or more carriage sliders and rail assemblies. In another embodiment, each assembly includes a linear rail including one or more surfaces that define a channel. In another embodiment, each assembly includes a carriage slider sub-assembly. In another embodiment, the carriage slider sub-assembly comprises a slider configured to be axially displaceable within the channel of the linear rail. In another embodiment, the carriage slider sub-assembly comprises one or more overload protection lobes including a first overload protection lobe positioned adjacent to a first end of the slider and a second overload protection lobe positioned adjacent to a second end of the slider. In another embodiment, the carriage slider sub-assembly comprises one or more friction reducing portions formed of a friction reducing material. In another embodiment, the actuatable door being coupled to a suite wall of the aircraft passenger suite, the suite wall including an opening configured to allow for access to the passenger suite from an open area within the aircraft cabin. In another embodiment, the actuatable door being configured to actuate between a stowed door position and a deployed door position via at least one intermediate door position, the actuatable door being configured to separate the passenger suite from the open area within the aircraft cabin when in the deployed door position and provide privacy to the aircraft passenger suite. In another embodiment, the one or more overload protection lobes are configured to make contact with a portion of the channel of the linear rail when an abuse load is applied to the assembly to provide overload protection. In another embodiment, the one or more overload protection lobes are configured to not make contact with a portion of the channel of the linear rail when an abuse load is not applied to the assembly.

In some embodiments, a first rail may be coupled to a first portion of the suite wall and a second rail is coupled to a second portion of the suite wall, a first carriage sub-assembly is coupled to a first portion of the actuatable door and a second carriage sub-assembly is coupled to a second portion of the actuatable door, the first carriage sub-assembly configured to be axially displaceable within the channel of the first rail and the second carriage sub-assembly configured to be axially displaceable within the channel of the second rail.

In some embodiments, the one or more friction reducing portions may be integrated within a portion of the slider.

In some embodiments, the one or more friction reducing portions may be over molded to the portion of the slider.

In some embodiments, the one or more friction reducing portions may include a first friction reducing portion coupled to a first portion of the channel and a second friction reducing portion coupled to a second portion of the channel, the first friction reducing portion configured to engage with a first portion of the slider when the slider is axially displaced within the channel of the linear rail, the second friction reducing portion configured to engage with a second portion of the slider when the slider is axially displaced within the channel of the linear rail.

In some embodiments, the one or more overload protection lobes may be formed of a metal.

In some embodiments, the one or more friction reducing portions may be formed of a plastic.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
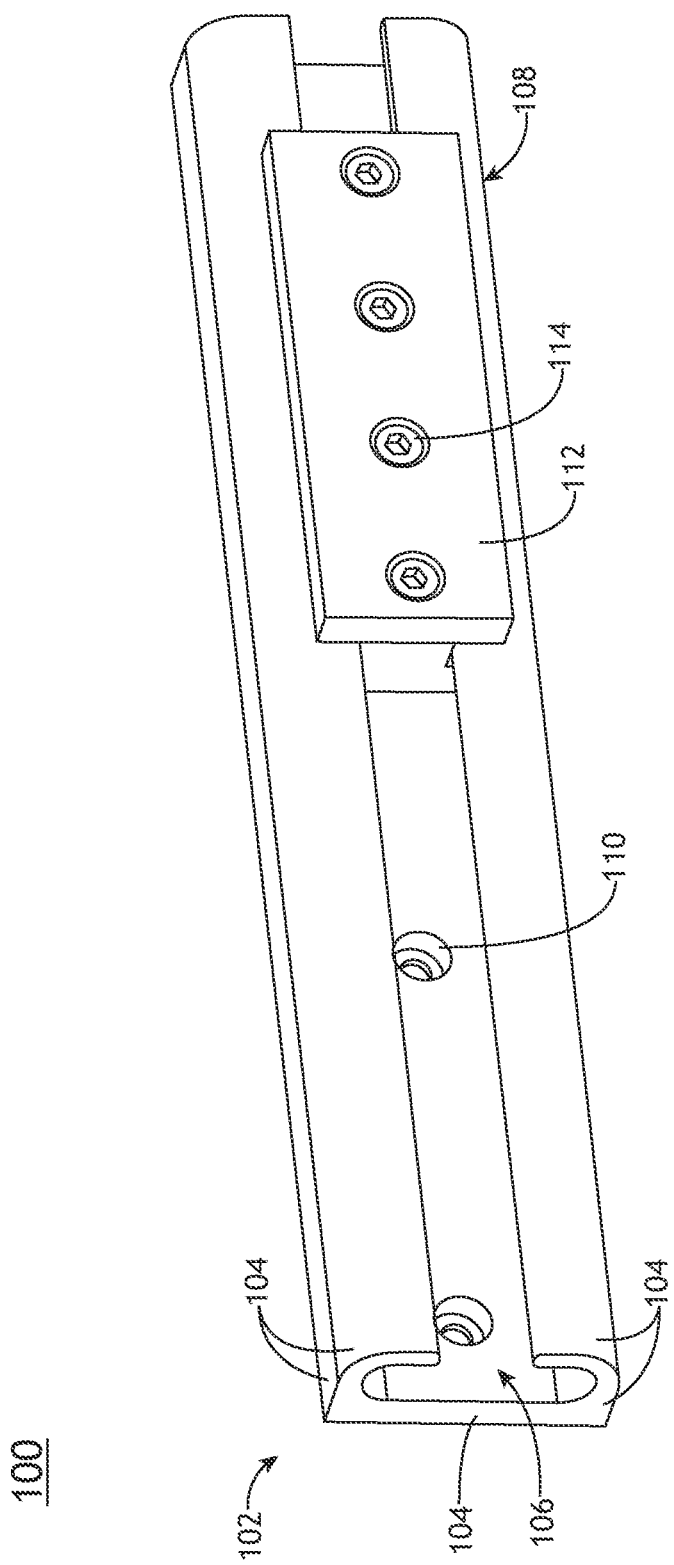
FIG. 1A illustrates a carriage and rail assembly, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-6B in general illustrate a carriage assembly with overload protection for an actuatable door for an aircraft passenger suite, in accordance with one or more embodiments of the disclosure.

Aircraft cabin designs may include passenger suites. A particular passenger suite may include a door to separate the passenger suite from other areas in the aircraft cabin (e.g., an aisle, an adjacent passenger suite, or the like). The separation of the passenger suite from other areas in the aircraft cabin may provide privacy to an occupant within the passenger suite when the door is closed. When the door is open, an opening within the passenger suite may be configured to allow for access to the passenger suite from an open area within the aircraft cabin (or egress from the passenger suite into the open area within the aircraft cabin. When the door is closed, the opening may temporarily prevent egress from the passenger suite into the open area within the aircraft cabin (e.g., preventing egress only to the extent such prevention does not inconvenience an occupant or generate an unsafe environment in the event of an emergency).

The door may include carriage sliders and linear rails to allow the door to open and close. For example, in select designs, the door may include plastic carriages to reduce friction. In such designs, the plastic in the carriage limits the static load that can be applied to the carriage before the carriage fails, which makes the plastic carriages inadequate for many door applications. Further, the door may include linear motion ball bearings and rails, which are large and heavy.

Aircraft cabin designs need to be certified in accordance with aviation guidelines and standards, while being designed so as not to lose the intended functionality of the structures and/or monuments in the aircraft cabin. For example, the structures and/or monuments in the aircraft cabin may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. For example, aircraft cabin structures and/or monuments in the aircraft cabin may present difficulties such as, but not limited to, failing to meet load requirements (e.g., 9 g static load requirements or 16 g dynamic load requirements), burn requirements, or the like as set forth by the FAA in 14 C.F.R. Part 25, AIRWORTHINESS STANDARDS: TRANSPORT CATEGORY AIRPLANES).

As such, it would be desirable to provide a carriage assembly with overload protection. The carriage assembly should allow for metal-to-metal contact between the carriage assembly and the rail so as to provide overload protection when an abuse load is applied. The carriage assembly should provide a load path that will not damage the carriage slider and allow the carriage slider to function after the excess load is removed. The carriage assembly should reduce cost and weight of the carriage assembly and the door.

Figure 1B:
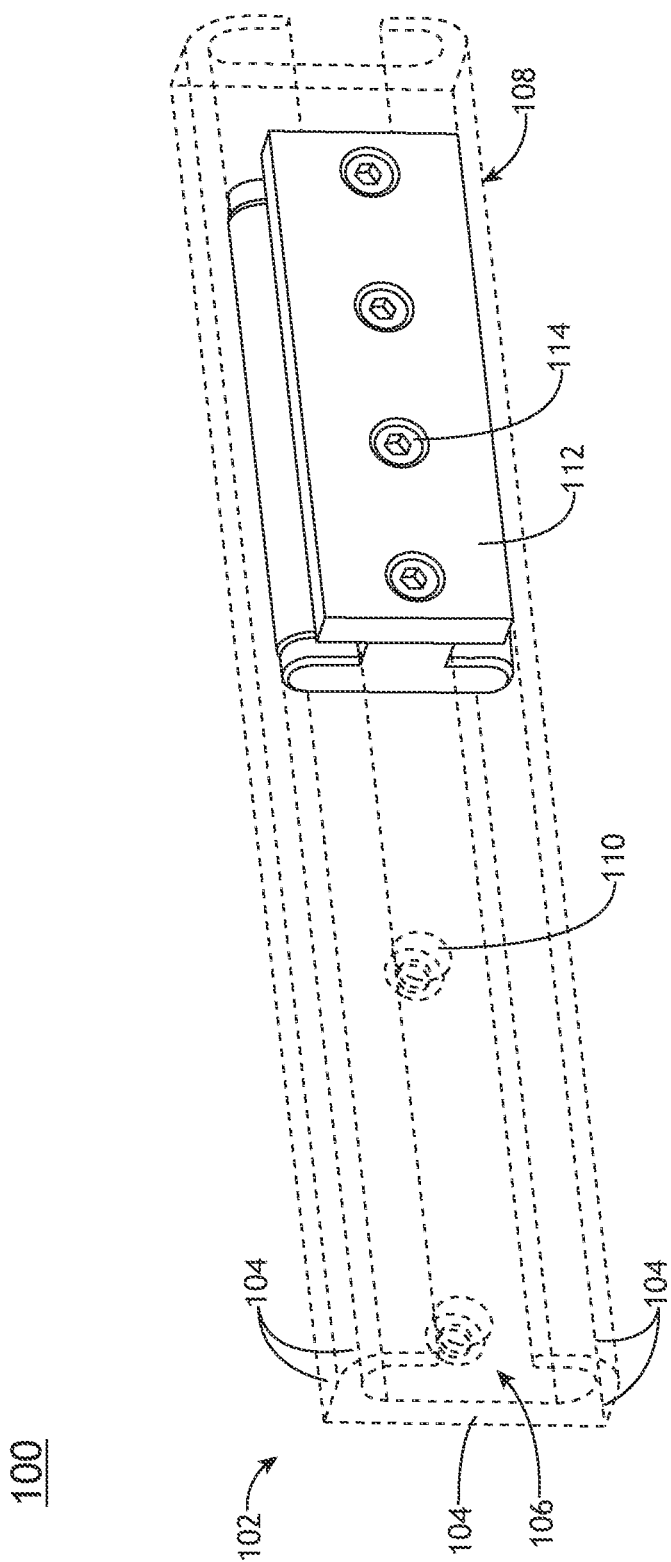
FIG. 1B illustrates the carriage and rail assembly, in accordance with one or more embodiments of the disclosure.
Figure 1C:
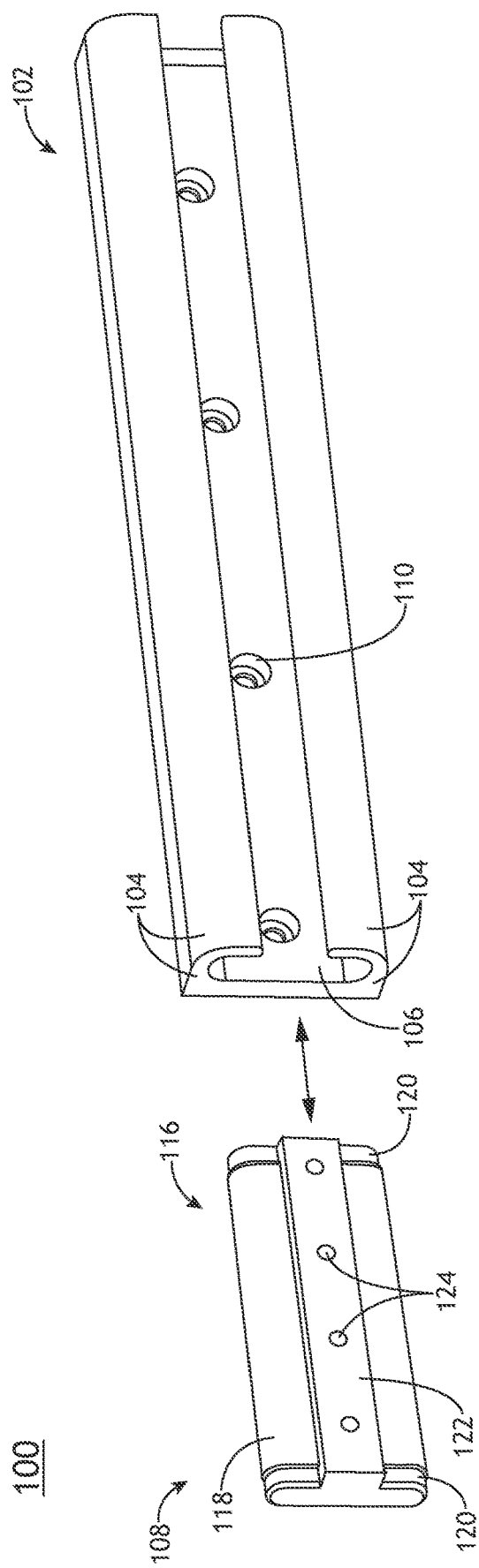
FIG. 1C illustrates the carriage and rail assembly, in accordance with one or more embodiments of the disclosure.
Figure 2B:
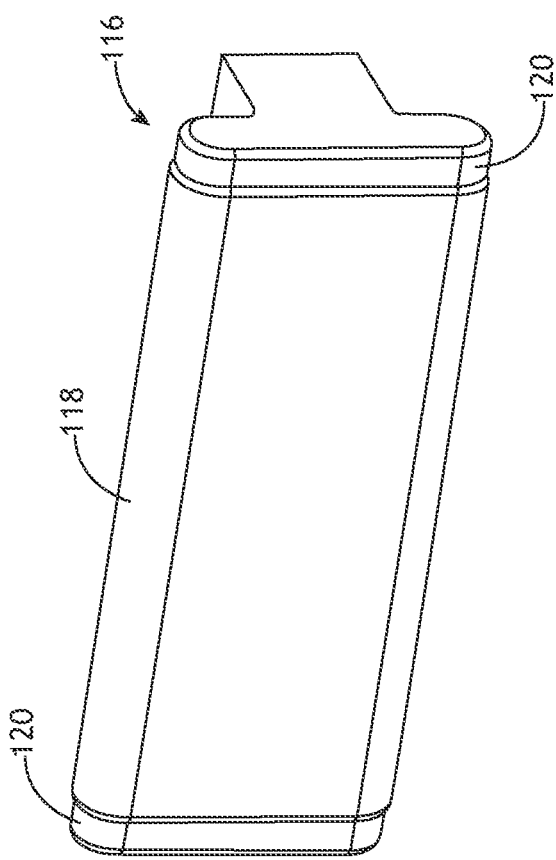
FIG. 2B illustrates the carriage sub-assembly, in accordance with one or more embodiments of the disclosure.
Figure 2A:
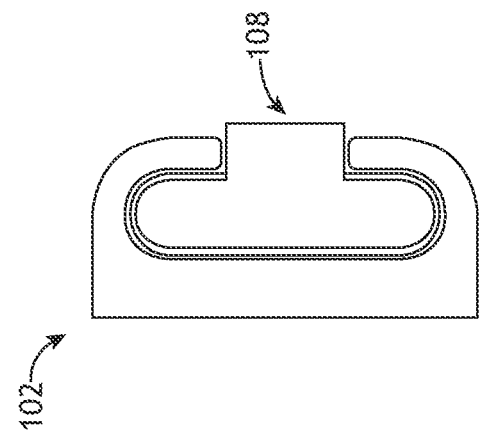
FIG. 2A illustrates a carriage sub-assembly, in accordance with one or more embodiments of the disclosure.

FIGS. 1A-1C illustrate a carriage and rail assembly 100, in accordance with one or more embodiments of the present disclosure. For purposes of the present disclosure, it is noted that the terms "carriage and rail assembly", "assembly," and variants thereof may be considered equivalents, unless otherwise noted herein.

The assembly 100 may include a linear rail 102 which extends in a longitudinal direction. The linear rail 102 may include one or more surfaces 104 that form a channel 106. For example, the channel 106 may be configured to receive a portion of a carriage slider sub-assembly 108. For instance, the channel 106 may include a cross-section shaped to receive a portion of a carriage slider sub-assembly 108. As shown in FIGS. 1A-1C, the channel 106 may be a "C-channel". Further, the channel 106 may be a "J-channel". Further, the channel 106 may be an "L-channel". In general, the channel 106 may include a cross-section having any shape configured to receive and/or conform to the carriage slider sub-assembly 108.

The assembly 100 may include a carriage slider sub-assembly 108. For purposes of the present disclosure, it is noted that the terms "carriage slider sub-assembly", "carriage sub-assembly", "sub-assembly," and variants thereof may be considered equivalents unless otherwise noted herein.

The linear rail 102 may include one or more through holes 110 to couple the linear rail 102 to one or more aircraft cabin components. For example, as discussed further herein with respect to FIGS. 4-5B, the one or more through holes 110 may be configured to receive one or more fasteners to couple the linear rail 102 to a portion of a suite wall 408. By way of another example, the one or more through holes 110 may be configured to receive one or more fasteners to couple the linear rail 102 to a portion of an actuatable door 404.

Referring to FIG. 1C, the carriage sub-assembly 108 may include a slider 116. The slider 116 may be configured to be axially displaceable within the channel 106 of the linear rail 102. For example, the slider 116 may include a cross-section having any shape configured to be axially displaceable within the channel 106 of the linear rail 102. In one instance, as shown in FIGS. 1A-3C, the slider 116 may be rectangular with rounded corners. In another instance, the slider 116 may be rectangular with sharp corners (i.e., 90-degree corners).

Figure 3A:
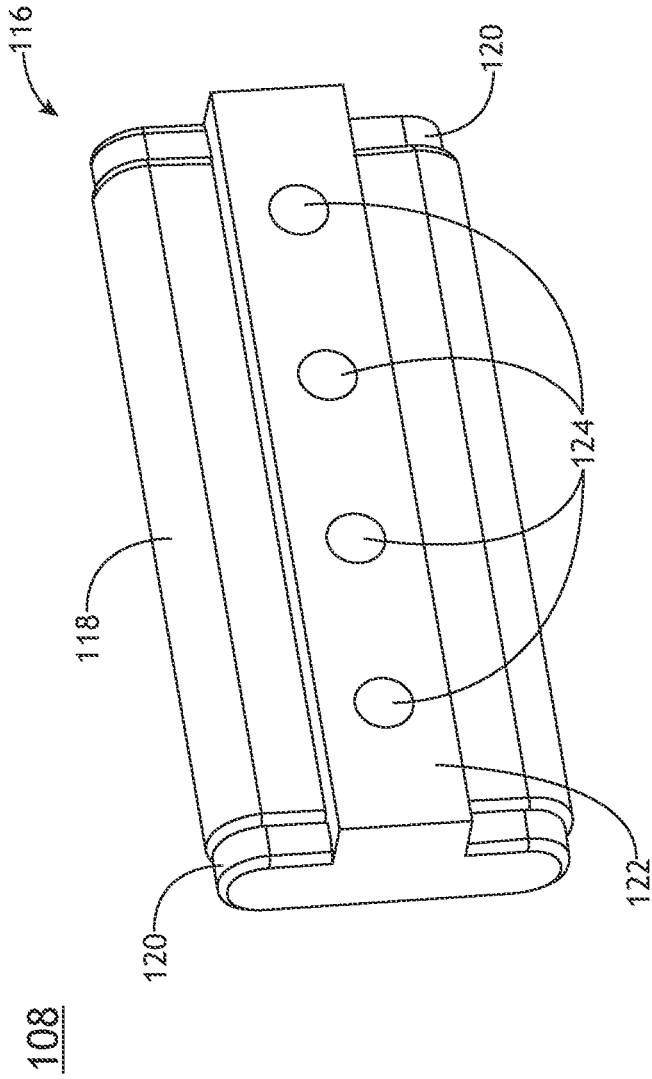
FIG. 3A illustrates the carriage sub-assembly, in accordance with one or more embodiments of the disclosure.

The assembly 100 may include a friction reducing portion 118. For example, the carriage sub-assembly 108 may include a friction reducing portion 118 on the slider 116. For instance, as shown in FIG. 3A, the carriage sub-assembly 108 may be fabricated as a single component and be formed of two or more materials (e.g., metal, plastic, and the like) using an over molded fabrication technique. In this regard, the carriage sub-assembly 108 may include a slider 116, a friction reducing portion 118, and one or more overload protection lobes 120.

Figure 3B:
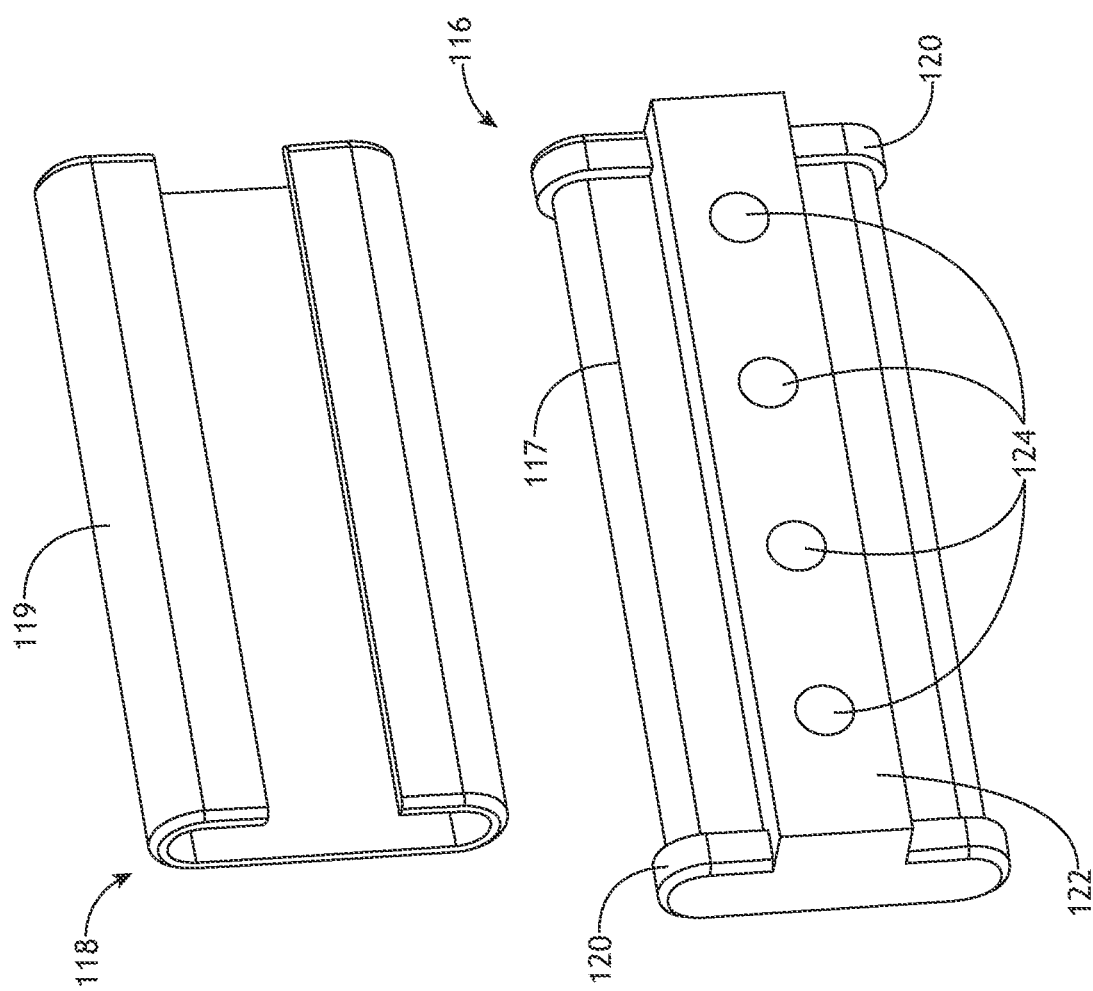
FIG. 3B illustrates the carriage sub-assembly, in accordance with one or more embodiments of the disclosure.

By way of another example, the carriage sub-assembly 108 may include a friction reducing casing 119 configured to couple to a portion 117 of the slider 116. It is noted that the friction reducing casing 119 may be coupled to the slider 116 via any coupling mechanism. For instance, as shown in FIG. 3B, the friction reducing casing 119 may be coupled to a portion 117 of the slider 116 via an interference fitting coupling mechanism.

Figure 3C:
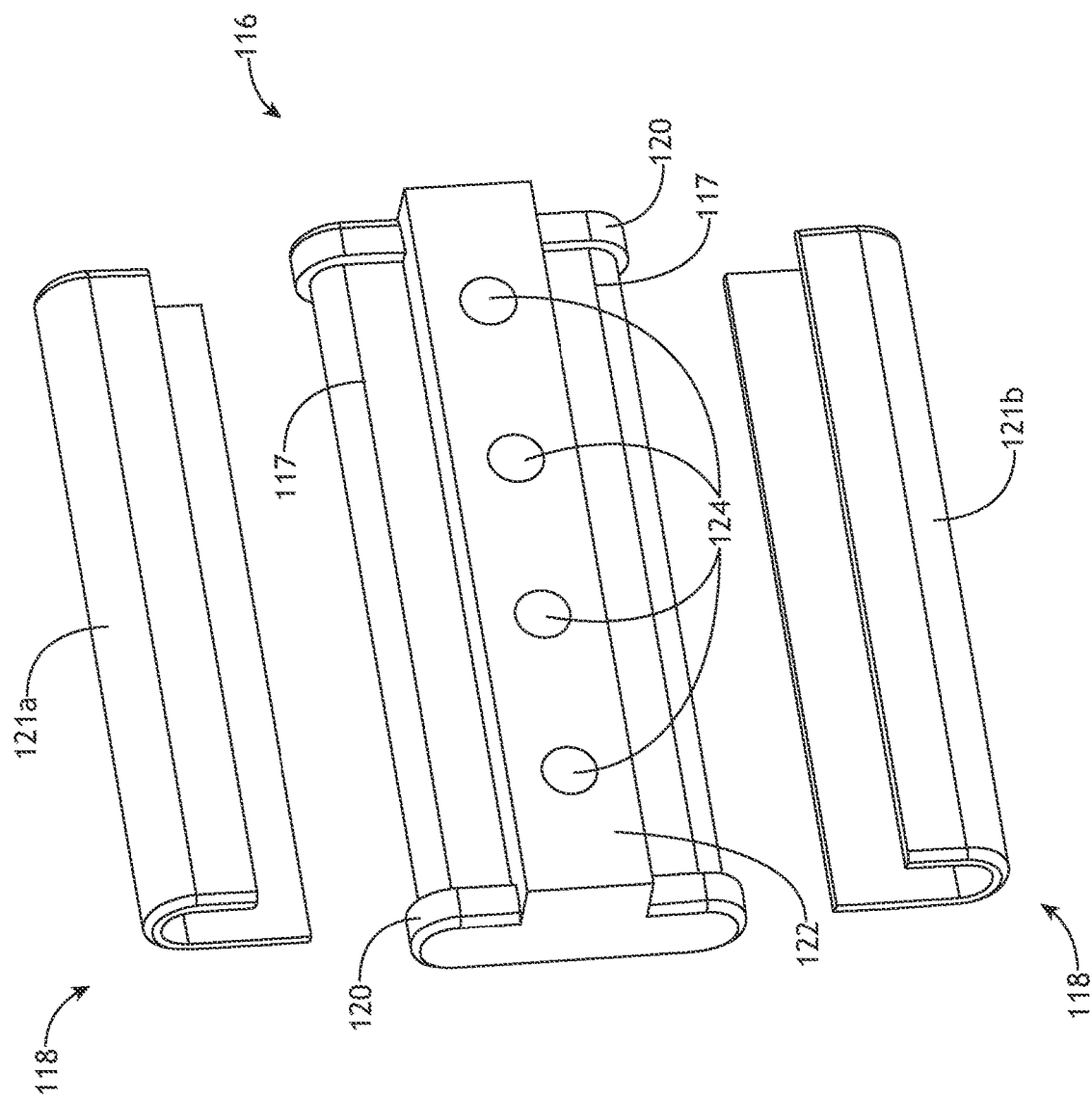
FIG. 3C illustrates the carriage sub-assembly, in accordance with one or more embodiments of the disclosure.

By way of another example, the linear rail 102 may include one or more friction reducing portions 118 coupled to one or more portions of the linear rail 102. For instance, as shown in FIG. 3C, a top friction reducing portion 121a may be coupled to a top portion of the channel 106 of the linear rail 102 and a bottom friction reducing portion 121b may be coupled to a bottom portion of the channel 106 of the linear rail 102. In this regard, the one or more friction reducing portions 118 may engage with a portion 117 on the slider 116 when the sub-assembly 108 is displaceable within the channel 106. It is noted that the rails 102 are not shown in FIG. 3C for purposes of simplicity and should not be construed as limiting the scope of the present disclosure.

It is noted that the friction reducing portion may be formed of any suitable friction reducing material including, but not limited to, one or more plastics, nylon, fiber reinforced nylon, fiber reinforced acetal, and the like.

The carriage sub-assembly 108 may include one or more overload protection lobes 120. For example, the slider 116 may include a first overload protection lobe 120 on a first end of the slider and a second overload protection lobe 120 on a second end of the slider. In one instance, the slider 116 and the friction reducing portion 118 may be dimensioned such that when the portion 118 is coupled to the slider 116, a portion of the slider 116 is exposed to form the one or more overload protection lobes 120. In this regard, the one or more overload protection lobes 120 are incorporated into the slider 116. It is noted that this reduces the complexity of the design and eliminates the need for a secondary fastener which may potentially fail when an abuse load is applied.

The slider and overload protection lobes may be formed of any material. For example, the slider and the overload protection lobes may be formed of a metal such as, but not limited to, aluminum, stainless steel, or the like.

Figure 6A:
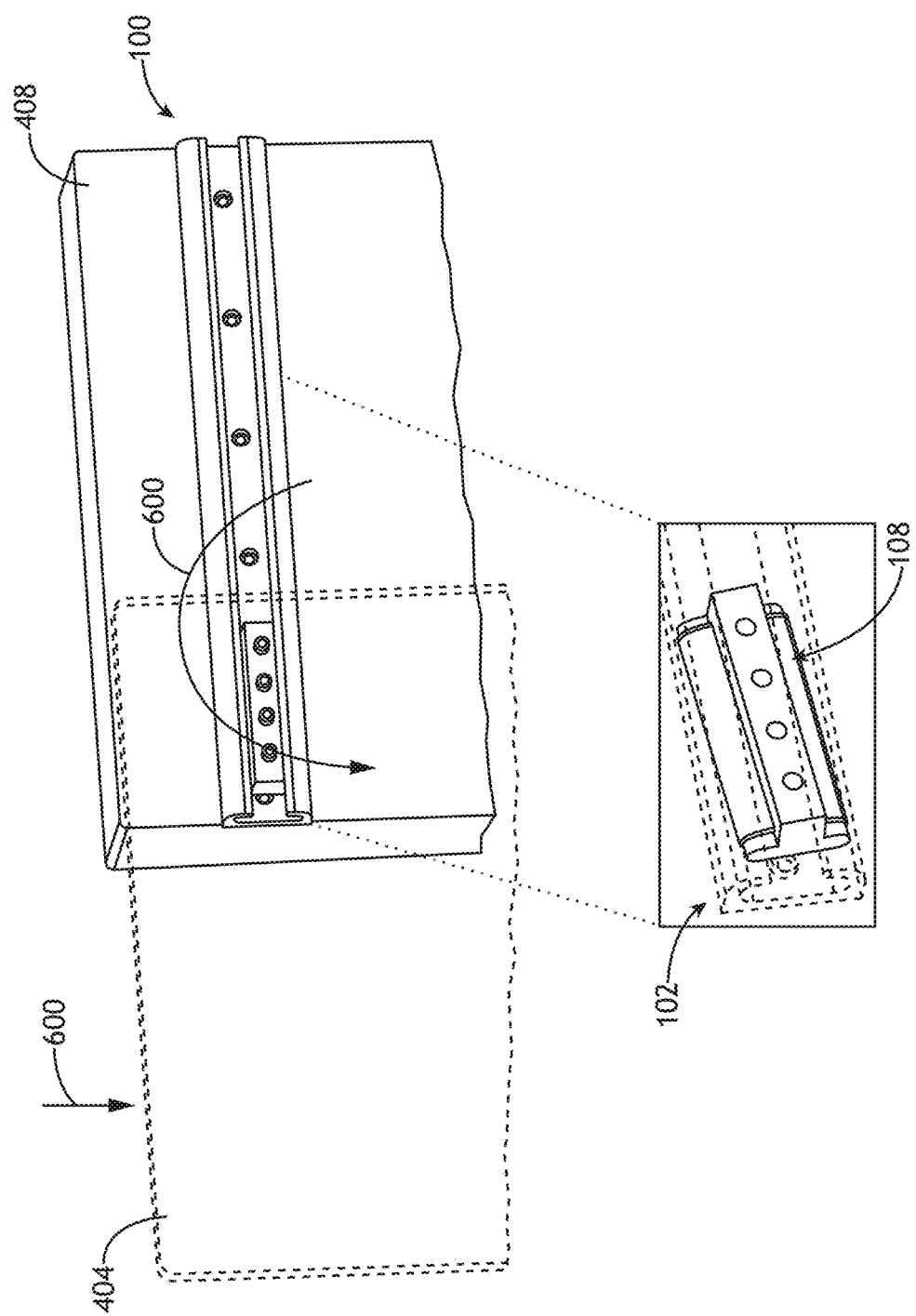
FIG. 6A illustrates an actuatable door including the carriage and rail assembly, in accordance with one or more embodiments of the disclosure.
Figure 6B:
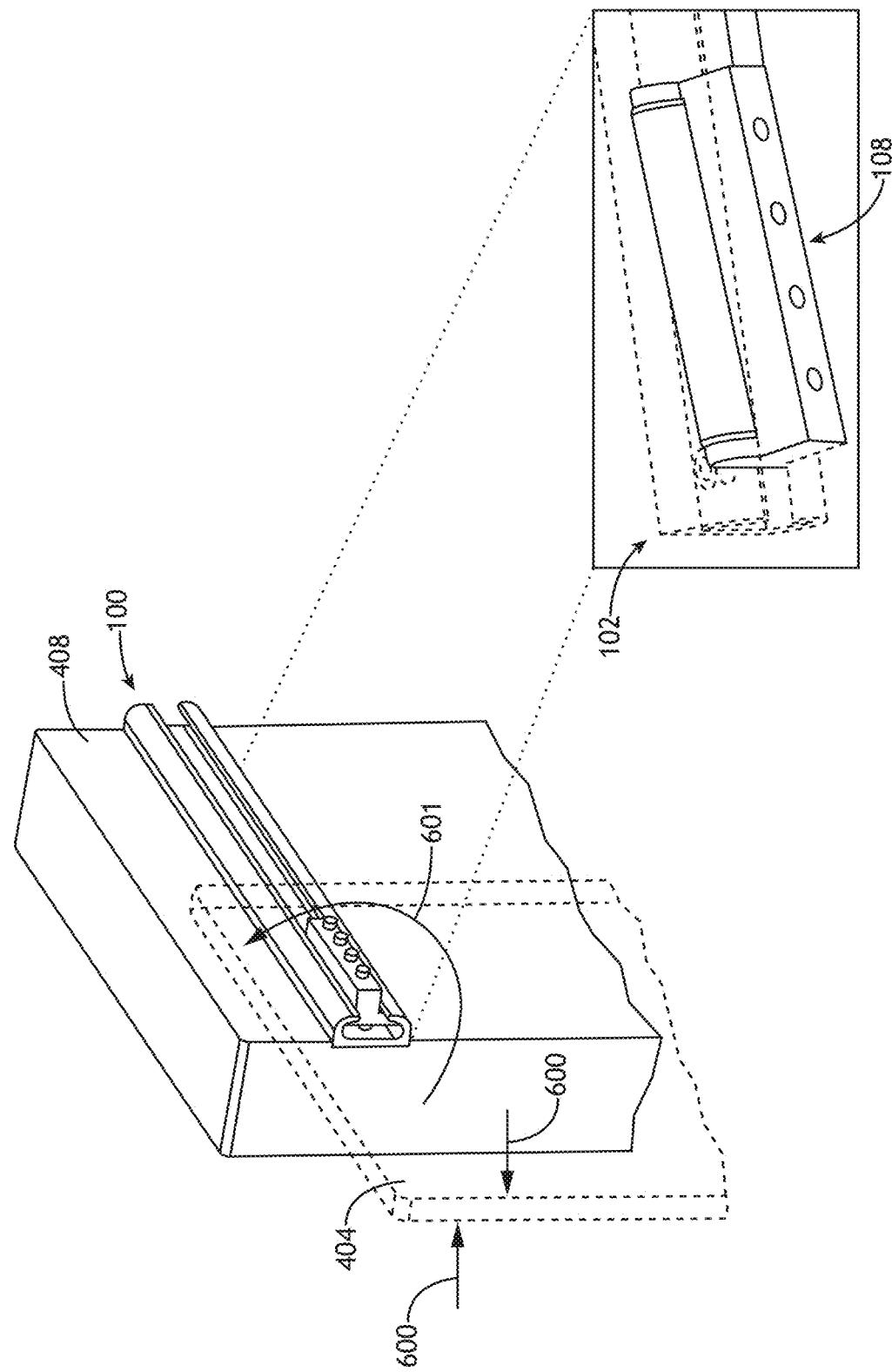
FIG. 6B illustrates an actuatable door including the carriage and rail assembly, in accordance with one or more embodiments of the disclosure.

It is noted that during normal operation (e.g., when an abuse load is not applied to the assembly 100) the overload protection lobes 120 may not make contact with the channel 106 of the rail 102. However, when an abuse load 600 is applied, as shown in FIGS. 6A-6B, the overload protection lobes 120 may translate and/or rotate about a direction 601 within the channel 106 of the linear rail 102, such that the overload protection lobes make contact with the linear rail 102 to provide overload protection. In this regard, the overload protection lobes 120 may prevent the carriage sub-assembly 108 from becoming damaged to allow the carriage slider sub-assembly 108 to function after the excess load is removed.

The carriage slider sub-assembly 108 may couple to the linear rail 102 via a fastening block 112 and one or more fasteners 114. For example, the slider 116 may include a raised portion 122 including one or more through holes 124, where the raised portion 122 is dimensioned to couple to a portion of the linear rail 102. For instance, when the carriage slider sub-assembly 108 is axially displaced within the channel 106 of the linear rail 102, the raised portion 122 may protrude through an opening in the linear rail 102. In this regard, the through holes 124 may be configured to receive one or more fasteners 114 of the fastening block 112 to secure the carriage slider sub-assembly 108 to the rail 102 and to one or more external aircraft cabin components (e.g., side wall, door, or the like).

Figure 4:
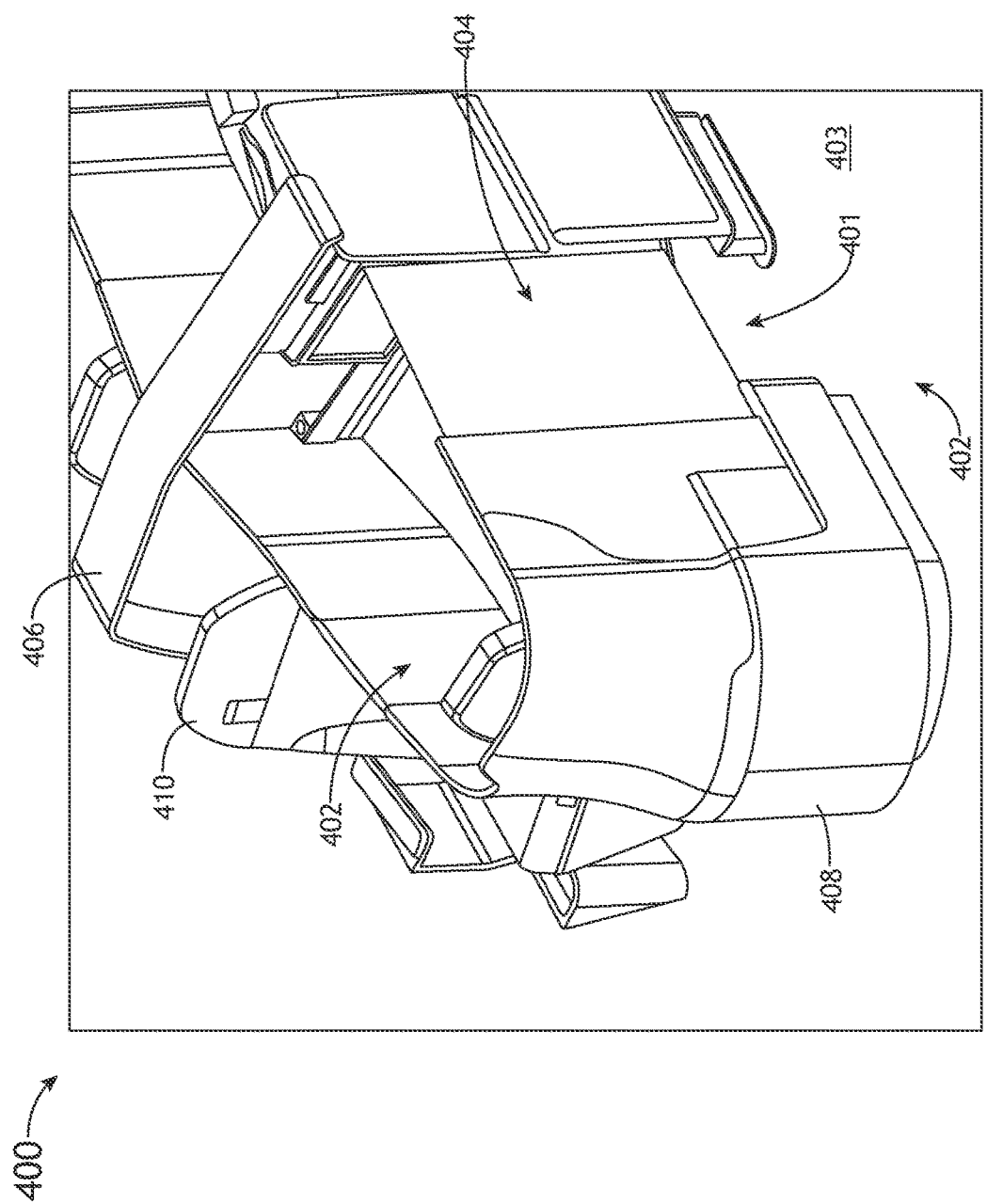
FIG. 4 illustrates an actuatable door including the carriage and rail assembly, in accordance with one or more embodiments of the disclosure.

FIG. 4 illustrates an aircraft cabin 400 and one or more passenger suites 402, in accordance with one or more embodiments of the disclosure.

The carriage and rail assembly 100 may be integrated with the aircraft cabin 400. For example, the carriage and rail assembly 100 may be integrated with one or more passenger suites 402.

The aircraft passenger compartment suite 402 may include an actuatable door 404 for the opening 401. It is noted that "actuatable door" and variants including, but not limited to, "actuatable screen", "door", and "screen" may be considered equivalent, for purposes of the disclosure.

The actuatable door 404 may separate the passenger suite 402 from other areas in the aircraft cabin 400 and may provide privacy to an occupant within the passenger suite 402 when the actuatable door 404 is in the deployed door position. When the actuatable door 404 is in the stowed door position (e.g., is open), the opening 401 within the passenger suite 402 may be configured to allow for access to the passenger suite 402 from an open area (e.g., the aircraft aisle 403, or other open area) within the aircraft cabin 400 (or egress from the passenger suite 402 into the open area within the aircraft cabin 400). When the door 404 is in the stowed door position, the opening 401 may temporarily prevent egress from the passenger suite 402 into the open area within the aircraft cabin 400 (e.g., preventing egress only to the extent such prevention does not inconvenience an occupant or generate an unsafe environment in the event of an emergency).

Where there are multiple passenger suites 402, the multiple passenger suites 402 may be separated by a bridge 406. The bridge 406 may define at least a portion of each of the multiple passenger suites 402. It is noted that adjacent passenger suites 402 may be considered as on particular sides of the bridge 406. Where there are multiple passenger suites 402, the multiple passenger suites 402 may be arranged in an inboard/outboard configuration and/or a forward/rearward configuration. It is noted, however, the multiple passenger suites 402 may be arranged in any configuration within the aircraft cabin 400.

The passenger suite 402 may include a suite wall 408 with one or more suite wall elements. For example, at least some of the one or more suite wall elements may be a component of a particular suite wall 408 corresponding to a particular passenger suite 402. By way of another example, at least some of the one or more suite wall elements (e.g., to the entirety of a suite wall 408 structure) may be shared between adjacent passenger suites 402.

The bridge 406 and/or the suite wall 408 may be implemented as a divider or structure separating adjacent passenger suites 402 and/or separating a passenger suite 402 from an area within the aircraft cabin 400. For example, where the bridge 406 is implemented as a separator, the bridge 406 may be configured to allow for the multiple passenger suites 402 to be installed within the aircraft cabin 400 in a more compact arrangement. In this regard, the amount of floor area of the aircraft cabin 100 necessary for the one or more aircraft seats 410 may be reduced.

The one or more passenger suites 402 may include one or more aircraft seats 410 (e.g., business class or first-class passenger seats). It is noted the terms "aircraft seats" and "passenger seats" may be considered equivalent, for purposes of the disclosure.

The one or more aircraft seats 410 may include, but are not limited to, seat pans, seat cushions, legs, support members, actuatable armrests, seatbelts, or the like. The one or more aircraft seats 410 may be attachable to embedded seat tracks located in a floor of the aircraft cabin 400 via conventional track fasteners and/or be couplable to the suite wall 408 (e.g., where the suite wall 408 may be attachable to embedded seat tracks located in the floor of the aircraft cabin 400 via conventional track fasteners).

An aircraft seat 410 may be rotatable about an axis (e.g., swivelable). The aircraft seat 410 may be fully positionable between the outer limits of motion as defined by the moveable components of the aircraft seat 410 and/or one or more auxiliary monuments of the passenger suite 402. It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted that any position that does not meet the above-defined requirements of the TTL position may be considered a non-TTL position, for purposes of the present disclosure. Further, it is noted the aircraft seat 410 may be actuatable (e.g., translatable and/or rotatable) from the TTL position to a non-TTL position, and/or vice versa. Further, it is noted the aircraft seat 410 may be capable of a fully upright or raised position, and that the TTL position may have a more reclined seat back cushion and a more angled upward seat pan cushion as compared to the fully upright or raised position. Therefore, the above description should not be interpreted as a limitation on the present disclosure but merely an illustration.

In general, the aircraft seat 410 may be translatable (e.g., trackable or slidable). The aircraft seat 410 may be rotatable about an axis cross-wise through the aircraft seat 410 into a position including, but not limited to, an upright or raised position, one or more lounge or reclined positions, and a lie-flat or bed position. For example, the aircraft seat 410 may transition directly between the upright or raised position and the lie-flat or bed position. By way of another example, it is noted the aircraft seat 410 may transition through one or more lounge or reclined positions between the upright or raised position and the lie-flat or bed position. By way of another example, the aircraft seat 410 may transition into one or more lounge reclined positions in a motion separate from the transition between the upright or raised position and the lie-flat or bed position. Therefore, the above description should not be interpreted as a limitation on the scope of the disclosure but merely an illustration.

The suite wall 408 may include an opening 401 within the one or more suite wall elements into the passenger suite 402. The opening 401 may allow for access to the passenger suite 402 from an aircraft aisle 403 within the aircraft cabin 400.

Figure 5:
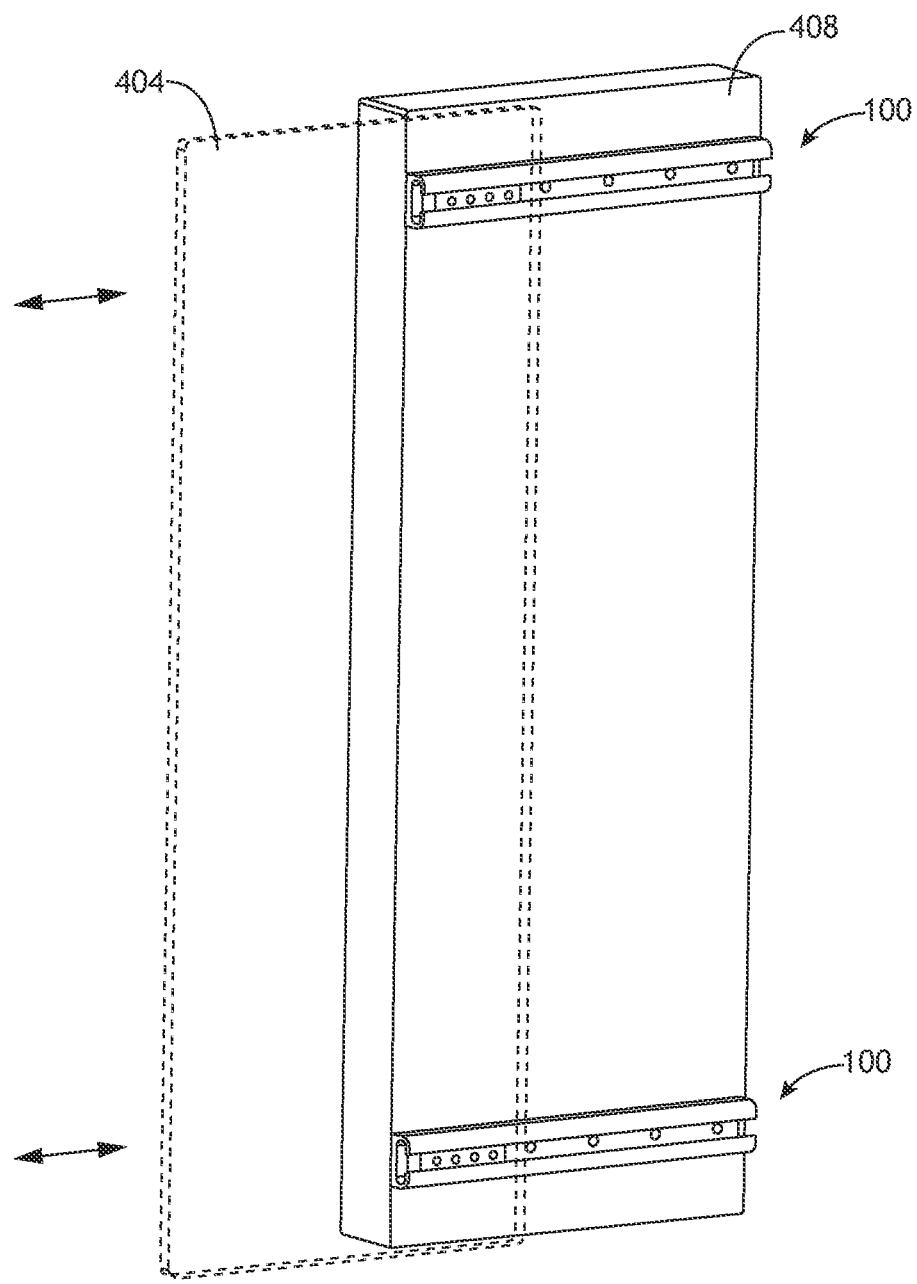
FIG. 5 illustrates an actuatable door including the carriage and rail assembly, in accordance with one or more embodiments of the disclosure.

FIGS. 5-6B illustrate the carriage and rail assembly 100 integrated with an actuatable door 404 and a suite wall 408, in accordance with one or more embodiments of the disclosure.

The carriage and rail assembly 100 may be integrated with one or more portions of the passenger suite 402. For example, the linear rail 102 may be coupled to a portion of the suite wall 408 and the carriage sub-assembly 108 may be coupled to a portion of the actuatable door. In one instance, as shown in FIG. 5, a first rail 102 may be coupled to a top portion of the door and an additional rail 102 may be coupled to a bottom portion of the door. Further, a first carriage sub-assembly 108 may be coupled to a top portion of the door and an additional carriage sub-assembly 108 may be coupled to a bottom portion of the door. In this regard, the door 404 may be actuated by axially displacing the carriage sub-assemblies 108 within the channels 106 of the rails 102.

When an abuse load 600 is applied to the door 404, as shown in FIGS. 6A-6B, the one or more overload protection lobes 120 may make contact with the linear rail 102 to provide overload protection. For example, the one or more overload protection lobes 120 may make metal-to-metal contact with the linear rail 102, as opposed to plastic-to-metal contact. In conventional carriages, this plastic-to-metal contact causes the plastic to break when an abuse load is applied. In this regard, the metal overload protection lobes 120 may prevent the carriage sub-assembly 108 from becoming damaged to allow the carriage slider sub-assembly 108 to function after the excess load is removed.

Although embodiments of the disclosure illustrate the actuatable door 404 being stowed in a specific location in the passenger suite 402, the stowed door position may be anywhere within the passenger suite 402 that would still allow for a deployed position within the opening 401.

It is noted the door 404 may be manually actuated. In addition, it is noted the door 404 may be electrically-actuated via a motor (e.g., a servo motor, or the like) coupled to a controller. For example, the controller may include one or more processors and memory, where the memory is configured to store a set of program instructions, where the set of program instructions are configured to cause the one or more processors to perform one or more actions with respect to actuations of the actuatable door 404. A user input device and/or a display may be installed within the passenger suite 402 or coupled to an exterior surface of the passenger suite 402, and the controller is configured to receive commands (e.g., to deploy the actuatable door 404 and/or stow the actuatable door 404) from the user input device and/or the display.

It is noted "vertical" may be understood as being defined with respect to a z-axis as illustrated in the Figures. In addition, it is noted "horizontal" may be understood as being defined with respect to an x-axis or a y-axis as illustrated in the Figures.

Although embodiments of the disclosure illustrate the assembly 100 being installed within the boundaries of the passenger suite 402 to actuate a door 404, it is noted the assembly 100 is not limited to the passenger suite environment and/or passenger suite components (e.g., door). For example, the assembly 100 may be installed into aircraft seats. For instance, the assembly 100 may be used to translate leg rests and/or arm rests of an aircraft seat. By way of another example, the assembly 100 may be installed into a privacy divider to translate the privacy divider. Therefore, the above description should not be interpreted as a limitation on the scope of the disclosure but merely an illustration.

Although embodiments of the disclosure illustrate the actuatable door 404 being installed and actuatable within the boundaries of the passenger suite 402, it is noted the actuatable door 404 may be coupled to an exterior surface of the passenger suite 402 and actuatable between the door stowed position and the door deployed position outside of the passenger suite 402 (e.g., in the aircraft aisle 403). Therefore, the above description should not be interpreted as a limitation on the scope of the disclosure but merely an illustration.

Although embodiments of the disclosure are directed to an aviation environment such as an aircraft cabin 400, it is noted the assembly 100 is not limited to the aviation environment and/or the aircraft components within the aviation environment. For example, the assembly 100 may be configured for any type of vehicle known in the art. For example, the vehicle may be any air, space, land, or water-based personal equipment or vehicle; any air, space, land, or water-based commercial equipment or vehicle; or any air, space, land, or water-based military equipment or vehicle known in the art. By way of another example, the assembly 100 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An actuatable door system comprising:
an actuatable door; and
one or more carriage slider and rail assemblies coupled to one or more portions of the actuatable door, each carriage slider and rail assembly comprising:
a linear rail, wherein the linear rail extends in a longitudinal direction, the linear rail including one or more surfaces that define a channel, the linear rail including one or more through holes to couple the linear rail to a portion of at least one of a suite wall or the actuatable door, wherein the suite wall is positioned proximate to the actuatable door; and
a carriage slider sub-assembly, the carriage slider sub-assembly comprising:
a slider, the slider configured to be axially displaceable within the channel of the linear rail, wherein the actuatable door is configured to translate between a stowed door position and a deployed door position upon axially displacing the slider within the channel of the linear rail, the slider comprising:
a plurality of lobes configured to be axially displaced within the channel of the linear rail, the plurality of lobes including a first lobe on a first end of the slider and a second lobe on a second end of the slider, wherein the first end is opposite the second end;
one or more friction reducing portions positioned between the first lobe on the first end of the slider and the second lobe on the second end of the slider; and
a horizontal raised portion, wherein the horizontal raised portion is arranged along a full length of a body of the slider between the first lobe on the first end of the slider and the second lobe on the second end of the slider, wherein the horizontal raised portion is configured to protrude through a horizontal opening in the linear rail, wherein the horizontal raised portion includes one or more additional through holes to couple the carriage slider sub-assembly to the at least one of the suite wall or the actuatable door, wherein the plurality of lobes are formed of metal and the channel of the linear rail is formed of metal, wherein metal-to-metal contact between the plurality of lobes and the channel of the linear rail is made when an abuse load is applied to the assembly.

2. The actuatable door of claim 1, wherein the one or more friction reducing portions are formed of a plastic.

3. The actuatable door system of claim 1, wherein the carriage slider sub-assembly further comprises:
a fastening block configured to couple to the horizontal raised portion, wherein the fastening block is configured to couple the horizontal raised portion of the linear rail to the carriage slider sub-assembly via the one or more additional through holes of the horizontal raised portion, wherein the fastening block is configured to couple the carriage slider sub-assembly to the at least one of the suite wall or the actuatable door.

4. The actuatable door system of claim 1, wherein the channel of the linear rail includes a C-shaped channel.

5. The actuatable door system of claim 4, wherein the slider is rectangular with rounded corners to correspond to the C-shaped channel of the linear rail.

6. The actuatable door system of claim 1, wherein metal of at least one of the plurality of lobes or the channel of the linear rail comprises at least one of:
aluminum or stainless steel.

7. An aircraft passenger suite installed within an aircraft cabin, comprising:
a suite wall;
an actuatable door; and
one or more carriage slider and rail assemblies, each carriage slider and rail assembly comprising:
a linear rail, the linear rail including one or more surfaces that define a channel, the linear rail including one or more through holes to couple the linear rail to a portion of the suite wall; and
a carriage slider sub-assembly, the carriage slider sub-assembly coupled to a portion of the actuatable door, the carriage slider sub-assembly comprising:
a slider, the slider configured to be axially displaceable within the channel of the linear rail, the slider comprising:
a plurality of lobes, the plurality of lobes including a first lobe on a first end of the slider and a second lobe p on a second end of the slider, wherein the first end is opposite the second end;
one or more friction reducing portions positioned between the first lobe on the first end of the slider and the second lobe on the second end of the slider; and
a horizontal raised portion that spans a length of a body of the slider, wherein the horizontal raised portion is arranged between the first lobe on the first end of the slider and the second lobe on the second end of the slider, wherein the horizontal raised portion is configured to protrude through a horizontal opening in the linear rail, wherein the horizontal raised portion includes one or more additional through holes to couple the carriage slider sub-assembly to the at least one of the suite wall or the actuatable door, wherein the plurality of lobes are formed of metal and the channel of the linear rail is formed of metal, wherein metal-to-metal contact between the plurality of lobes and the channel of the linear rail is made when an abuse load is applied to the assembly, the actuatable door being coupled to the suite wall of the aircraft passenger suite, the suite wall including an opening configured to allow for access to the passenger suite from an open area within the aircraft cabin, the actuatable door being configured to actuate between a stowed door position and a deployed door position via at least one intermediate door position upon axially displacing the slider within the channel of the linear rail, the actuatable door being configured to separate the passenger suite from the open area within the aircraft cabin when in the deployed door position and provide privacy to the aircraft passenger suite.

8. The aircraft passenger suite of claim 7, wherein a first rail is coupled to a first portion of the suite wall and a second rail is coupled to a second portion of the suite wall, a first carriage sub-assembly is coupled to a first portion of the actuatable door and a second carriage sub-assembly is coupled to a second portion of the actuatable door, the first carriage sub-assembly configured to be axially displaceable within the channel of the first rail and the second carriage sub-assembly configured to be axially displaceable within the channel of the second rail.

9. The aircraft passenger suite of claim 7, wherein the one or more friction reducing portions are formed of a plastic.

10. The aircraft passenger suite of claim 7, wherein the carriage slider sub-assembly further comprises:
a fastening block configured to couple to the horizontal raised portion, wherein the fastening block is configured to couple the horizontal raised portion of the linear rail to the carriage slider sub-assembly via the one or more additional through holes of the horizontal raised portion, wherein the fastening block is configured to couple the carriage slider sub-assembly to the at least one of the suite wall or the actuatable door.

11. The aircraft passenger suite of claim 7, wherein the channel of the linear rail includes a C-shaped channel.

12. The aircraft passenger suite of claim 11, wherein the slider is rectangular with rounded corners to correspond to the C-shaped channel of the linear rail.

13. The aircraft passenger suite of claim 7, wherein metal of at least one of the plurality of lobes or the channel of the linear rail comprises at least one of:
aluminum or stainless steel.

* * * * *